United States Patent
Hawkins

(10) Patent No.: US 9,787,909 B1
(45) Date of Patent: Oct. 10, 2017

(54) CONTROLLING SIGNAL-TO-NOISE RATIO IN HIGH DYNAMIC RANGE AUTOMATIC EXPOSURE CONTROL IMAGING

(71) Applicant: STMICROELECTRONICS (RESEARCH & DEVELOPMENT) LIMITED, Buckinghamshire (GB)

(72) Inventor: Ed Hawkins, Edinburgh (GB)

(73) Assignee: STMICROELECTRONICS (RESEARCH & DEVELOPMENT) LIMITED, Buckinghamshire (GB)

(*) Notice: Subject to any disclaimer, the term of this patent is extended or adjusted under 35 U.S.C. 154(b) by 0 days.

(21) Appl. No.: 15/087,018

(22) Filed: Mar. 31, 2016

(51) Int. Cl.
*H04N 5/235* (2006.01)
*H04N 5/355* (2011.01)
*H04N 5/243* (2006.01)
*H04N 5/357* (2011.01)

(52) U.S. Cl.
CPC ........... *H04N 5/2355* (2013.01); *H04N 5/243* (2013.01); *H04N 5/355* (2013.01); *H04N 5/357* (2013.01); *H04N 5/35536* (2013.01)

(58) Field of Classification Search
CPC .... H04N 5/23232; H04N 5/243; H04N 5/357; H04N 5/355; H04N 5/35536
See application file for complete search history.

(56) References Cited

U.S. PATENT DOCUMENTS

| 7,262,770 B2* | 8/2007 | Sloan | G06T 15/506 345/419 |
| 2009/0059039 A1 | 3/2009 | Smith et al. | |
| 2010/0097493 A1* | 4/2010 | Asoma | H04N 5/235 348/229.1 |
| 2010/0141789 A1* | 6/2010 | Fossum | H04N 5/2352 348/222.1 |
| 2010/0271512 A1* | 10/2010 | Garten | G09G 5/06 348/239 |
| 2011/0013848 A1* | 1/2011 | Hasegawa | G06T 5/008 382/232 |

(Continued)

FOREIGN PATENT DOCUMENTS

| EP | 2 439 930 A2 | 4/2012 |
| WO | 2017/087598 A1 | 5/2017 |

OTHER PUBLICATIONS

STMicroelectronics, STV0991 Versatile imaging processor data sheet, Rev 7, DocID025930, Oct. 2015, 10 pgs.

(Continued)

*Primary Examiner* — Shahbaz Nazrul
(74) *Attorney, Agent, or Firm* — Seed IP Law Group LLP

(57) ABSTRACT

Method and apparatus for controlling signal-to-noise ratio (SNR) in high dynamic range automatic exposure control imaging are disclosed. In the method and apparatus, image data is received and a shadow threshold is determined based on the image data. Further, a respective threshold integration ratio is determined for each merge transition of a plurality of exposures having a respective plurality of exposure times. The threshold integration ratio is determined based on a threshold SNR for the merge transition. In the method and apparatus, an integration ratio for each merge transition is determined based on the shadow threshold and the threshold integration ratios. An output image is generated based on the determined integration ratios for each merge transition.

22 Claims, 11 Drawing Sheets

(56) References Cited

U.S. PATENT DOCUMENTS

| | | | | |
|---|---|---|---|---|
| 2011/0254976 A1* | 10/2011 | Garten | ................... | G06F 3/1454 |
| | | | | 348/229.1 |
| 2012/0044381 A1* | 2/2012 | Jannard | ................... | H04N 5/235 |
| | | | | 348/229.1 |
| 2012/0162366 A1* | 6/2012 | Ninan | ................... | H04N 5/2355 |
| | | | | 348/43 |
| 2012/0249830 A1* | 10/2012 | Tsubaki | ................... | G06T 5/008 |
| | | | | 348/229.1 |
| 2012/0262600 A1* | 10/2012 | Velarde | ................ | H04N 5/2355 |
| | | | | 348/223.1 |
| 2013/0120610 A1* | 5/2013 | Tsubaki | ................. | H04N 5/235 |
| | | | | 348/229.1 |
| 2015/0103209 A1* | 4/2015 | Elhachimi | .............. | H04N 5/265 |
| | | | | 348/239 |
| 2015/0201118 A1 | 7/2015 | Lee et al. | | |
| 2016/0187199 A1* | 6/2016 | Brunk | ................... | G01J 3/2823 |
| | | | | 348/89 |

OTHER PUBLICATIONS

Hasinoff et al., "Noise-Optimal Capture for High Dynamic Range Photography," 2010 IEEE Conference on Computer Vision and Pattern Recognition (CVPR), San Francisco, CA, USA, Jun. 13-18, 2010, pp. 553-560.

Martinez et al., "Adaptive exposure estimation for high dynamic range imaging applied to natural scenes and daylight skies," *Applied Optics* 54(4):B241-B250, Feb. 1, 2015.

Seshadrinathan et al., "Noise and Dynamic Range Optimal Computational Imaging," 2012 19$^{th}$ IEEE International Conference on Image Processing (ICIP), Orlando, FL, USA, Sep. 30-Oct. 3, 2012, pp. 2785-2788.

\* cited by examiner

CONTROLLING SIGNAL-TO-NOISE RATIO IN HIGH DYNAMIC RANGE AUTOMATIC EXPOSURE CONTROL IMAGING

BACKGROUND

Technical Field

This application is directed to multi-exposure imaging and, in particular, to multi-exposure automatic exposure control (AEC) imaging.

Description of the Related Art

In multi-exposure automatic exposure control (AEC) imaging, abrupt signal-to-noise ratio (SNR) transitions often occur between similar tones. The SNR transitions, which may be visually noticeable, may degrade image quality and introduce undesirable artifacts in the image. The SNR transitions result from merging multi-exposure images having different SNR profiles.

BRIEF SUMMARY

In an embodiment, an apparatus comprises: an input, which, in operation, receives image data and digital image processing circuitry. The digital image processing circuitry, in operation: determines a shadow threshold based on the image data; determines, for each merge transition of a plurality of exposures having a respective plurality of exposure times, a respective threshold integration ratio based on a threshold signal-to-noise ratio (SNR) for the merge transition; determines, based on the shadow threshold and the threshold integration ratios, an integration ratio for each merge transition; and generates an output image based on the determined integration ratios and exposure times for each merge transition. In an embodiment, generating the output image includes merging the plurality of exposures based on the determined integration ratios for the merge transition. In an embodiment, the digital image processing circuitry adjusts exposure times of a plurality of subsequent exposures based on the integration ratios for the plurality of merge transitions. In an embodiment, generating the output image includes: sending, to a sensor, a command to capture the plurality of subsequent exposures having the adjusted exposure times; receiving, at the input, the plurality of subsequent exposures having the adjusted exposure times; and generating the output image by merging the plurality of subsequent exposures having the adjusted exposure times. In an embodiment, the plurality of exposure times are different from each other. In an embodiment, determining the integration ratio for the merge transition includes: identifying a first ratio between a saturation point of a first exposure having a shortest exposure time and the shadow threshold; dividing the first ratio into respective integration ratios for each merge transition; and adjusting the integration ratios based on the threshold integration ratio for merge transition. In an embodiment, the saturation point of the first exposure is a maximum pixel level of the first exposure. In an embodiment, dividing the first ratio includes setting a portion of the first ratio as a first integration ratio for a first merge transition between the first exposure and a second exposure of the plurality of exposures and setting a remainder of the first ratio as the second integration ratio for the second exposure. In an embodiment, determining the threshold integration ratio for each merge transition includes determining the threshold integration ratio based on an SNR model of a sensor used to capture the plurality of exposures. In an embodiment merging the plurality of exposures includes using a first exposure of the plurality of exposures to provide pixels of an upper mid-tone region of a scene, using one or more other exposures of the plurality of exposures to provide pixels of a lower mid-tone region of the scene, and using another exposure of the plurality of exposures to provide pixels of a shadow region of the scene.

In an embodiment, a system comprises: a sensor, which, in operation, captures an image of a scene and outputs image data representing the scene and a controller having digital image processing circuitry, which, in operation: receives the image data; determines a shadow threshold based on the image data; determines, for each merge transition of a plurality of exposures having a respective plurality of exposure times, a respective threshold integration based on a desired minimum signal-to-noise ratio (SNR) for the merge transition; determines, based on the shadow threshold and the threshold integration ratios, an integration ratio for each merge transition; and generates an output image based on the determined integration ratios for each merge transition.

In an embodiment, a method comprises: receiving image data; determining a shadow threshold based on the image data; determining, for each merge transition of a plurality of exposures having a respective plurality of exposure times, a respective threshold integration ratio based on a threshold signal-to-noise ratio (SNR) for the merge transition; determining, based on the shadow threshold and the threshold integration ratios, an integration ratio for each merge transition; and generating an output image based on the determined integration ratios for each merge transition.

In an embodiment, an apparatus comprises: means for receiving image data; means for determining a shadow threshold based on the image data; means for determining, for each merge transition of a plurality of exposures having a respective plurality of exposure times, a respective threshold integration ratio based on a threshold signal-to-noise ratio (SNR) for the merge transition; means for determining, based on the shadow threshold and the threshold integration ratios, an integration ratio for each merge transition; and means for generating an output image based on the determined integration ratios for each merge transition.

DETAILED DESCRIPTION

Figure 1:
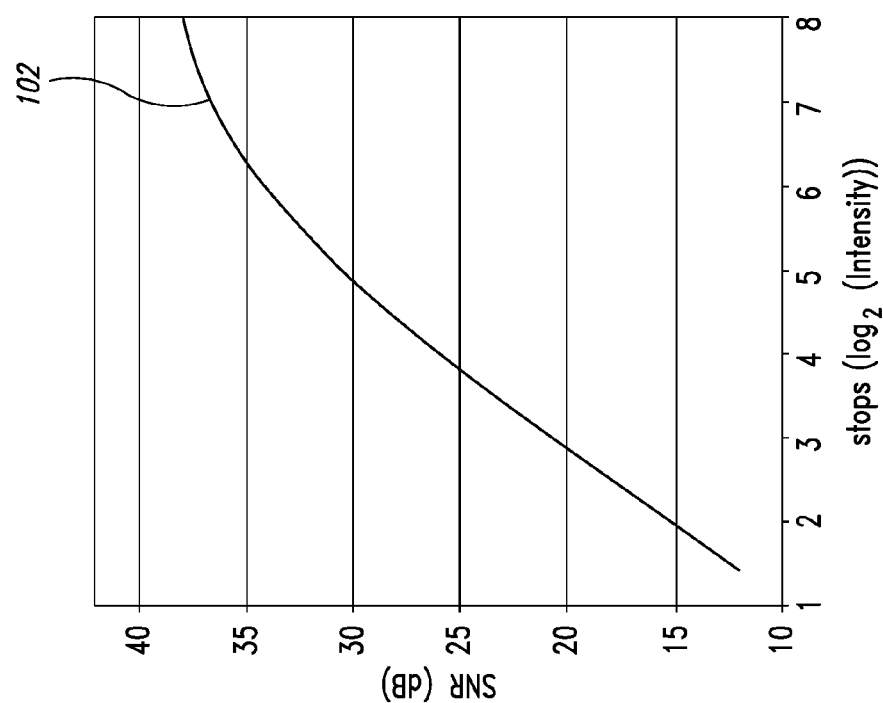
FIG. 1 shows a signal-to-noise ratio curve for a sensor.

FIG. 1 shows a signal-to-noise ratio (SNR) curve 102 for a sensor. The SNR curve 102 is sensor-specific and analog gain- and digital gain-specific. The SNR curve 102 shows the SNR for pixels in an image captured by the sensor as a function of the intensity of the pixel. In general, the SNR for a pixel increases as the intensity of the pixel increases. That is, brighter image pixels are associated with a higher SNR than darker pixels. A contribution of a scene captured by the sensor to the pixel increases in relation to a contribution of noise as the brightness of the pixel increases. Accordingly, for the exemplary sensor, whose SNR curve 102 is shown in FIG. 1, as with virtually all sensors, more noise power is introduced in relation to signal power in darker areas than in brighter areas.

The SNR curve 102 applies to images captured by a given sensor for a given exposure time. A different SNR curve may be applicable for a different exposure time of the sensor. The exposure time is a length of time that a pixel gathers light of a scene. As is recognized, in general, the longer the exposure time, the brighter the resulting captured pixel. If the exposure time is short, a darker image is obtained than would have been available with a longer exposure time. However, a long exposure time typically results in introducing motion artifacts (such as blurring or "ghosts") in an image. For example, if an object in a scene moves, the movement will be tracked in the captured image due to the long exposure.

High dynamic range imaging attempts to produce images by merging a plurality of exposures that are each associated with a respective plurality of exposure times. The plurality of exposure times of the respective plurality of exposures may be different from one another.

Figure 2:
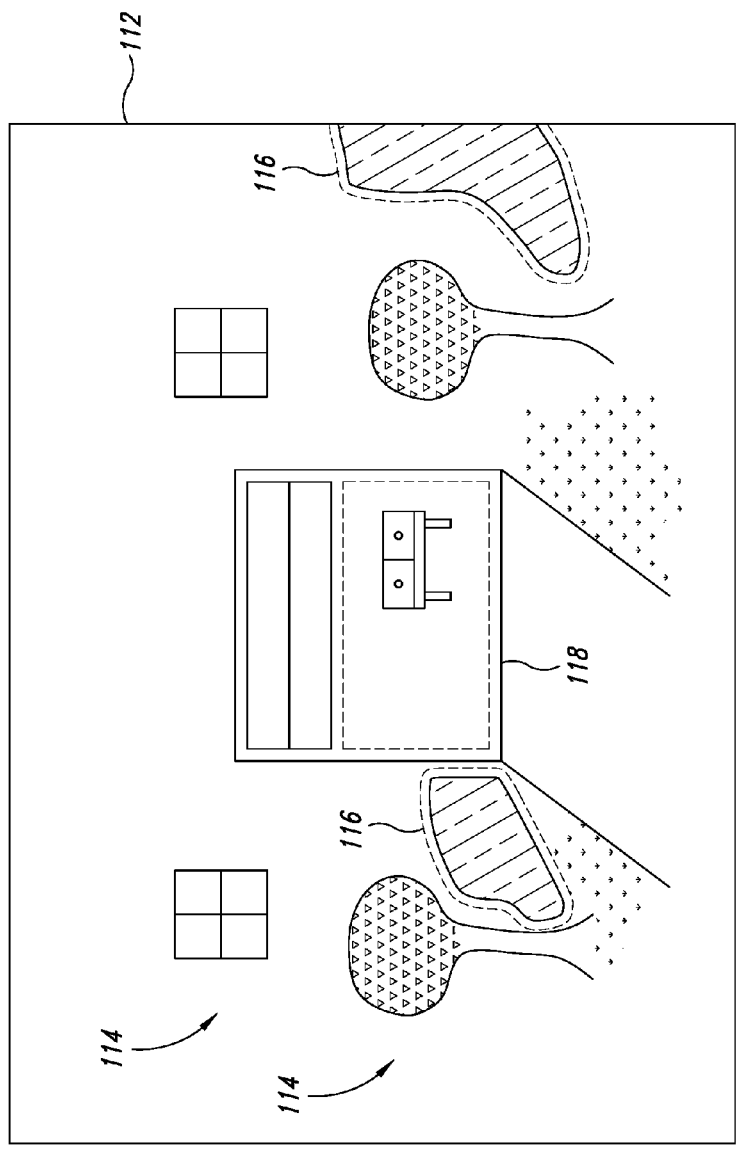
FIG. 2 shows an example of merging in high dynamic range imaging.

FIG. 2 shows an example of merging in high dynamic range imaging. In the example, an image 112 of a scene comprises a plurality of exposures 114, 116, 118. A first exposure 114 has a first exposure time that is relatively short. A second exposure 116 has a second exposure time that is longer than the first exposure time. A third exposure 118 has a third exposure time that is longer than the second exposure.

The first exposure 114 may be used to capture regions of the scene that are relatively well-lit and luminous. Because these regions are luminous, a short exposure time may be used. The short exposure time minimizes motion artifacts in the first exposure. The second exposure 116 may be used to capture regions of the scene that are not as well-lit and luminous as those of the first exposure. For example, grey zones and partial shadow regions may be captured using the second exposure 116. The third exposure 118, on the other hand, may capture the shadows of the scene.

As shown in FIG. 2, an interior of a garage is captured using the third exposure 118 having the longest exposure time. The shadows of trees in the scene are captured with the second exposure 116 that has a moderate exposure time. Parts of the scene that are not in the shadows and are luminous are captured using the first exposure 114 having the shortest exposure time.

It is noted that although three exposures are described with reference to FIG. 2, high dynamic range imaging may be performed using any number of exposures, such as two exposures or four exposures. Furthermore, the techniques described herein are applicable to any number of exposures.

Figure 3:
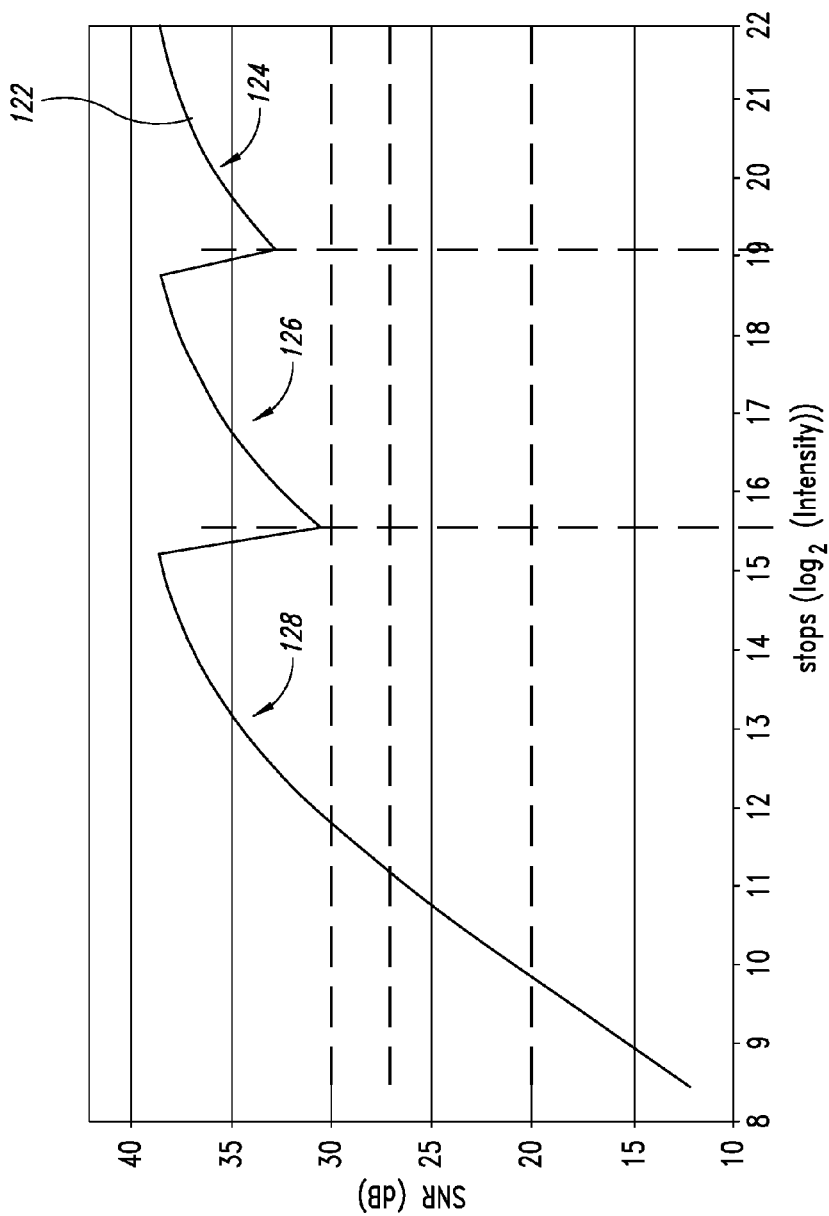
FIG. 3 shows an example of a signal-to-noise ratio curve for a sensor in high dynamic range imaging.

FIG. 3 shows an example of a signal-to-noise ratio (SNR) curve 122 for a sensor in high dynamic range imaging. The SNR curve 122 comprises three segments 124, 126, 128. The three segments 124, 126, 128 are respectively associated with the plurality of exposures. The first segment 124, which is associated with the first exposure, is shown in FIG. 3 to extend from 19 to 22 stops. A stop is an outcome of a base two logarithm applied to the intensity of a pixel. For example, the pixel range may be $2^0$ to $2^{22}$, whereby $2^{22}$ is considered to be a saturation point of the sensor. The saturation point is the maximum point of image data capable of being captured by the sensor. The saturation point may also be the brightest pixel level captured by the sensor.

Pixels having an intensity between 19 and 22 stops may be provided by the first exposure and may have associated SNRs that are between 32 and 39 decibel (dB) as provided by the SNR curve 122. The second exposure is used for pixels having an intensity between 15.5 and 19 stops. Because the second exposure has an exposure time that is longer than the first exposure, the second exposure may be used for pixels that are darker than those of the first exposure. The third exposure, which has the longest exposure time, is used for pixels between 1 and 15.5 stops. As shown in FIG. 3, the SNR decreases for pixels in the shadows of the image.

Figure 4:
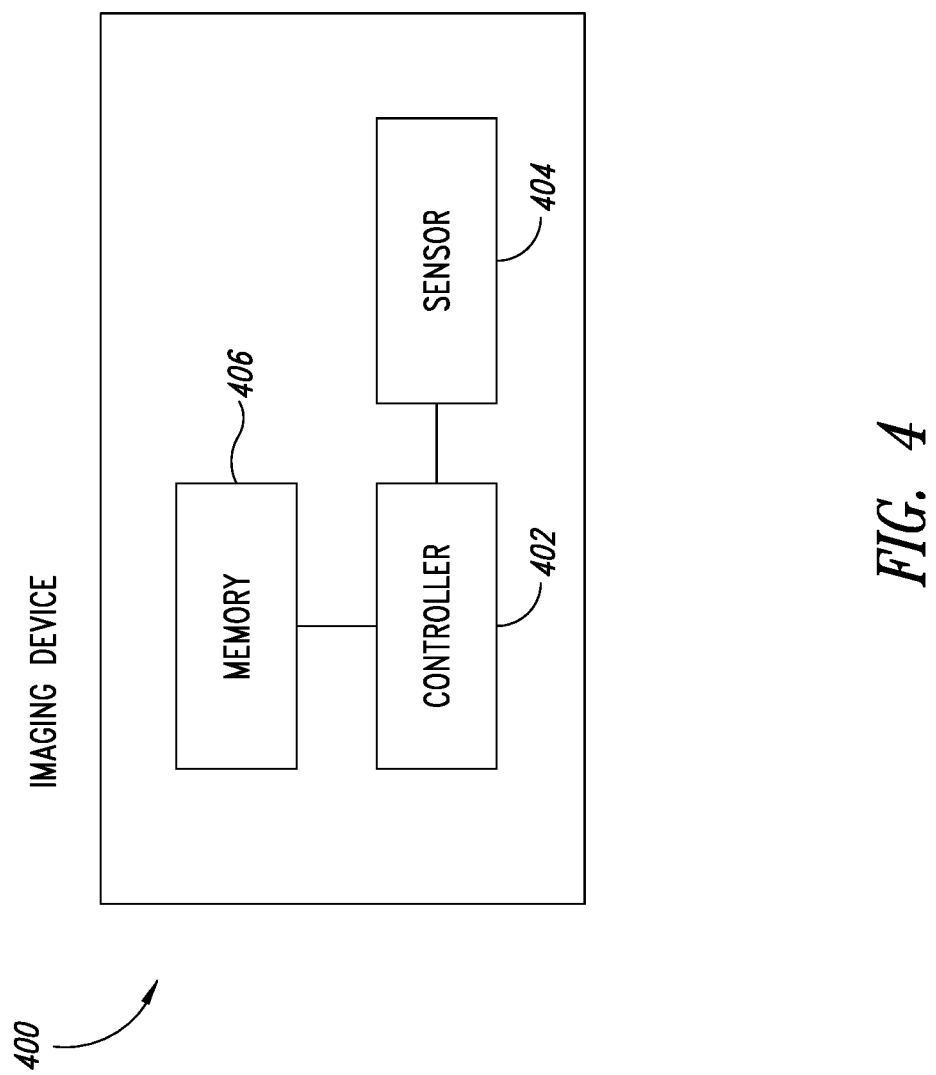
FIG. 4 shows a block diagram of an automatic exposure control imaging device.

FIG. 4 shows a block diagram of an automatic exposure control imaging device 400. The imaging device 400 comprises a controller 402, a sensor 404 and memory 406. The controller 402, which may be any type of controller, such as a microcontroller, or a processor, is operatively coupled to the sensor 404, which may be an optical sensor, such as a camera. The controller 402 includes circuitry configured to perform imaging processing and SNR control as described herein. The controller 402 instructs the sensor 404 to capture an image (an exposure) of a scene (for example, at which the sensor 404 is pointed). The controller 402 may instruct the sensor 404 to capture the exposure by sending a command to the sensor 404. The controller 402 may specify in the command an exposure time to be used in capturing the exposure. The exposure time may be a length time of time that a shutter of the sensor 404 remains open for the exposure to be collected. In general, the exposure time is proportional to the brightness of the captured exposure.

The sensor 404 captures the exposure in accordance with the exposure time and sends the exposure to the controller 402 for processing. The controller 402 receives the exposure at its input. The controller 402 may instruct the sensor 404 to capture multiple exposures as described herein. The multiple exposures may each be associated with a different exposure time. The controller 402 processes the exposures received from the sensor 404 as described herein. The controller 402 is coupled to memory 406, and the controller 402 may cause the exposure to be stored in the memory 406. Furthermore, the memory 406 may also store an SNR model (or curve) for the sensor 404, the commanded exposure time, etc. The controller 402 may access the SNR model stored in the memory 406 and may use the SNR model to control the SNR of a multiple exposure image. The memory 406 may store executable instructions that, when executed by the controller 402, cause the controller 402 to control the exposure times and/or the SNR in multi-exposure image processing and generally perform image processing as described herein.

Figure 5:
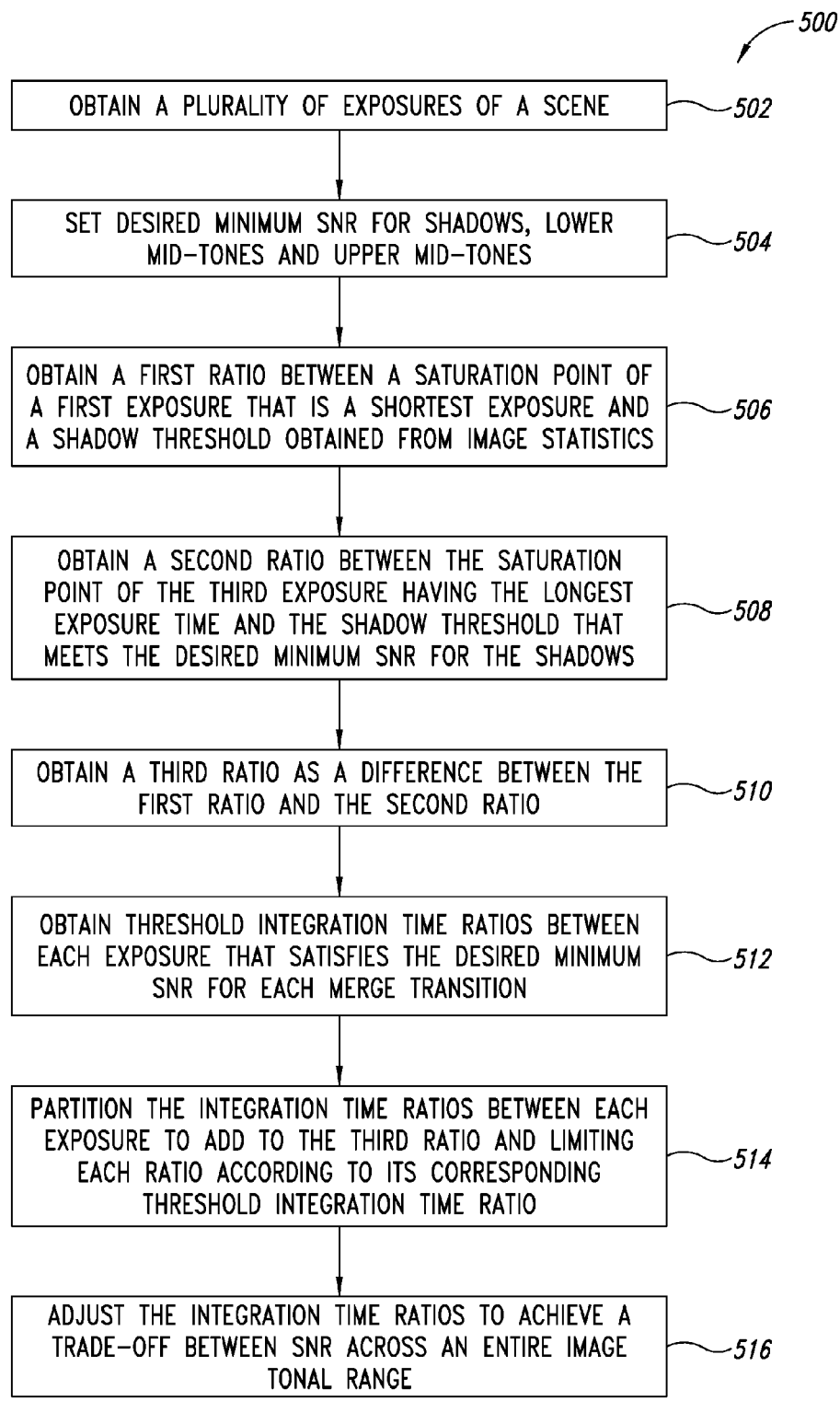
FIG. 5 shows a method for controlling the signal-to-noise ratio in high dynamic range imaging.

FIG. 5 shows a method 500 of controlling the signal-to-noise ratio (SNR) in high dynamic range imaging. In the method 500, a controller of an imaging device, such as the controller described with reference to numeral 402 in FIG.

4, obtains, at 502, a plurality of exposures of a scene. The plurality of exposures are respectively associated with a plurality of exposure times. The first exposure of the plurality of exposures has a shortest exposure time and the last exposure of the plurality of exposures has the longest exposure time. To facilitate description, the plurality of exposures are described herein as including three exposures. However, it may be recognized that any other number of exposures may be used.

Figure 6:
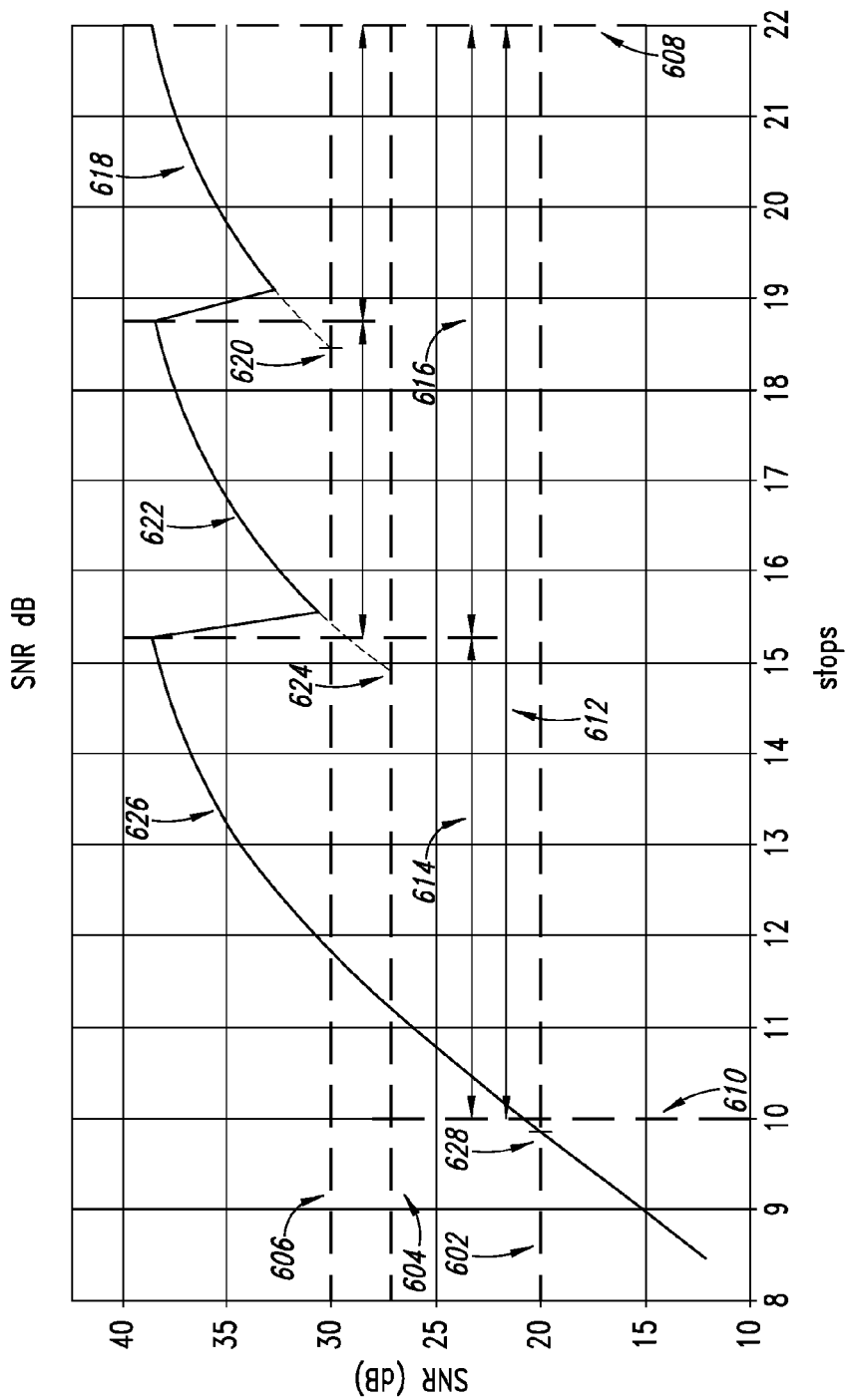
FIG. 6 shows an example of a signal-to-noise ratio curve for a sensor in high dynamic range imaging.

The controller sets, at 504, a desired minimum SNR for each exposure, e.g., for the upper mid-tones (first exposure), lower mid-tones (second exposure) and shadows (third exposure). The desired minimum SNRs may be user specified. The desired minimum SNR for the upper mid-tones may be the highest of the desired minimum SNRs. The desired minimum SNR for the shadows, conversely, may be the lowest of the desired minimum SNRs. As shown in FIG. 6, for example, the desired minimum SNR for the shadows (line 602) is set to 20 dB, the desired minimum SNR for the lower mid-tones (line 604) is set to 25 dB and the desired minimum SNR for the upper mid-tones is set to 30 dB (line 606).

A relatively low desired minimum SNR may result in fewer motion artifacts (such as blurring and 'ghosting') and a noisier image, whereas a relatively high desired minimum SNR may result in more motion artifacts and a less noisy image. The noise model for a sensor (which may be accessible in the sensor's firmware) may be used to accurately predict the SNR for a given amount of light received at the sensor. Depending on the brightness of the light, it may be classified as 'shadows', 'mid-tones', or 'highlights'.

The controller obtains, at 506, a first ratio between a saturation point of a first exposure and a shadow threshold from image statistics. The first exposure has the shortest exposure time of the plurality of exposure times as described herein. The saturation point of the first exposure may be a maximum resolution of the first exposure (such as $2^{22}$ if the sensor resolution is 22 bits). The shadow threshold may be flexibly defined, whereby a percentage of the pixels of an exposure may be deemed as shadows. For example, 4% of the pixels of an exposure may be deemed to be in the shadows. To determine the shadow threshold, one or more test exposures may be captured and a histogram of the test exposures may be obtained. The shadow threshold may be set, for example, to 4% and the shadow threshold may be deemed to be all pixels in the bottom 4% of pixel levels of a test exposure or a set of exposures.

As shown in FIG. 6, line 608 represents the saturation point of the first exposure while line 610 represents the pixel level of the shadows determined from the statistics of the test exposure(s). As shown in FIG. 6, a shadow threshold may be any pixel or set of pixels that have a brightness of 10 stops or less. The first ratio, denoted by line 612 in FIG. 6, is a divisor of the saturation point of the first exposure and the pixel level of the shadows. Because the saturation point of the first exposure is $2^{22}$ and the shadows threshold is $2^{10}$, the first ratio is determined to be $2^{22}/2^{10}=2^{12}$ or 12 stops.

The controller, at 508, obtains a second ratio between a saturation point of the third exposure having the longest exposure time and the shadow threshold that meets the desired minimum SNR for the shadows (20 dB). As shown in FIG. 6, the saturation point of the third exposure is 15.2 stops. Furthermore, the shadow pixel level of 10 stops meets the desired minimum SNR for the shadows. The second ratio is, thus, the difference between 15.2 stops and 10 stops or 5.2 stops. The second ratio is represented by line 614 in FIG. 6.

The controller, at 510, obtains a third ratio as a difference between the first ratio and the second ratio. It is noted that the difference is obtained when operating in the logarithmic domain. When operating in the linear domain, the third ratio is obtained as a quotient of the first ratio and the second ratio. The third ratio is the ratio between the saturation point of the first exposure having the shortest exposure time and the saturation point of the third exposure having the longest exposure time. The third ratio is represented by line 616 in FIG. 6.

The controller, at 512, obtains threshold integration time ratios between each exposure that satisfies the desired minimum SNR for each merge transition. The threshold integration ratio is defined as the intensity (for example, measured in stops) at which the desired minimum SNR for an exposure is met. The threshold integration time may be obtained from the SNR model of the sensor. The SNR model may be specified by a manufacturer of the sensor and may represent the SNR at various brightness levels for exposures captured by the sensor. A given sensor made by a manufacturer may have a different SNR model than other sensors made by the same manufacturer or other manufacturers.

Making reference to FIG. 6, the first SNR curve 618 of the first exposure having shortest exposure time is extrapolated to find the number of stops that meets the desired minimum SNR for the first SNR curve 618. The desired minimum SNR is met at 18.5 stops (at 620). Similarly, the second SNR curve 622 of the second exposure is extrapolated to find the number of stops that meets the desired minimum SNR for the second SNR curve 622. The desired minimum SNR for the merge transition between the lower mid-tones and the shadows is met at 14.9 (at 624). In addition, the third SNR curve 626 of the third exposure is extrapolated to find the number of stops that meets the desired minimum SNR for the third SNR curve 626 (the shadows). The desired minimum SNR is met at 9.9 (at 628).

The controller, at 514, partitions or divides the third ratio 616 between the ratio of the integration times of the first to second exposures and the ratio of the integration times of the second to third exposures. For example, the controller may partition the third ratio 616 equally between the integration ratio of the first to second exposures and the integration ratio of the second to third exposures. Accordingly, the integration ratios multiply to produce the third ratio 616. The third ratio 616 is divided between the integration ratios while limiting each ratio according to its corresponding threshold integration ratio determined based on the desired minimum SNR 604, 606. The third ratio 616 of FIG. 6 may be divided, and a first portion of the third ratio 616 may be designated as the integration time of the second exposure relative to the first exposure and a second portion of the third ratio may be designated as the integration time of the third exposure relative to the second exposure.

The controller, at 516, adjusts the integration ratios to achieve a trade-off between SNR across an entire tonal range of the image as described herein. For example, the integration ratio of the first to second exposures and the integration ratio of the second to third exposures may be increased or decreased in order to control the SNR for the first and second exposures.

Figure 7:
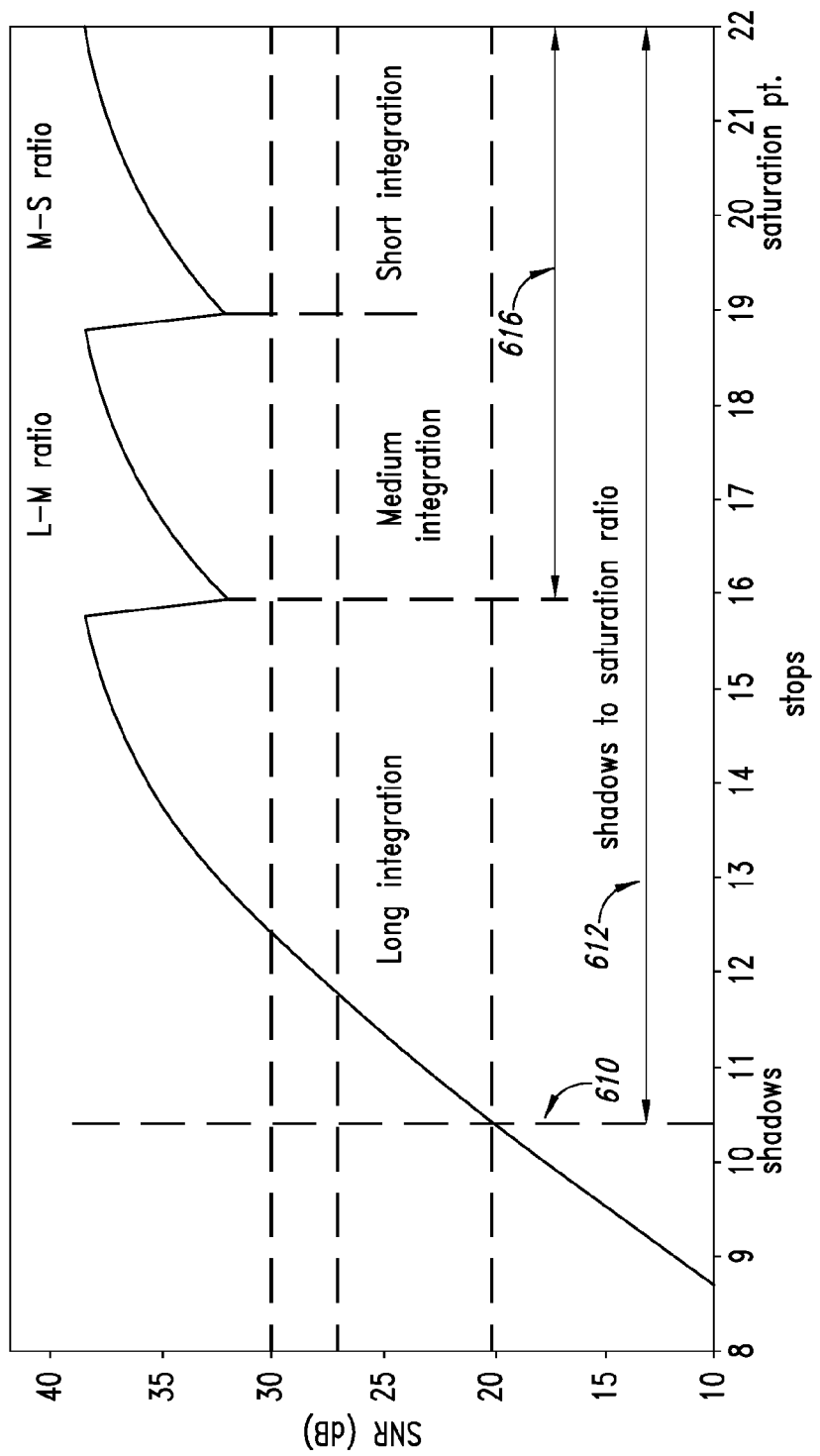
FIG. 7 shows an example of partitioning the ratio between the saturation point of an exposure having the shortest exposure time and the saturation point of an exposure having the longest exposure time into two integration ratios in accordance with at least one embodiment.

FIG. 7, shows an example of partitioning the ratio between the saturation point of the first exposure having the shortest exposure time and the saturation point of the third exposure having the longest exposure time into two integration ratios in accordance with at least one embodiment. In FIG. 7, the third ratio 616 is 6 stops (22−16 stops). This ratio is equally partitioned between the ratio of the integration times of the first to second exposures and the ratio of the integration times of the second to third exposures. The first exposure includes pixels having intensities between 19 and 22 stops and second exposure includes pixels having intensities between 16 and 19 stops. Using the above partitioning, the SNR for the first exposure is above the desired minimum SNR for the first exposure of 30 dB. Similarly, the desired minimum SNR for the second exposure of 27 dB is also met over a pixel range of the second exposure. In addition, the SNR at the shadows (shown at line 610) satisfies the desired minimum SNR for the shadows.

The integration time ratios between successive integrations may be adjusted to increase the SNR at the shadows. For example, if the integration time ratio of the second to third exposures is increased (for example, by 1 stop), the SNR level at the shadows will increase by about 5 dB. However, the integration ratios of the first to second exposures and second to third exposures may be limited by the determined threshold integration ratios for each merge transition. For example, it may not be desirable to increase the integration ratio of the first to second exposures by more than 1 stop as that would result in the SNR level dropping below the desired minimum SNR level of 30 dB at the merge transition between the first exposure and the second exposure.

Figure 8:
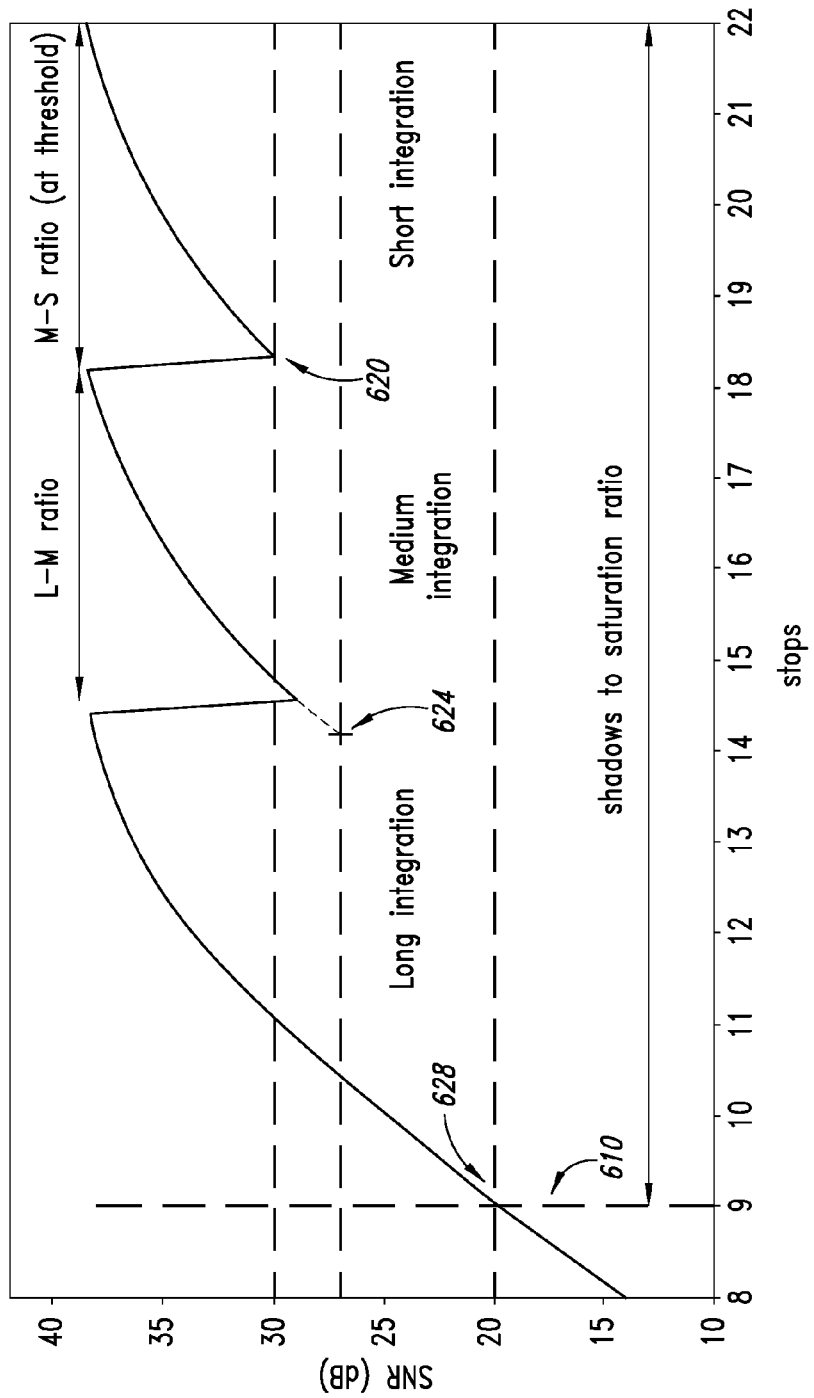
FIG. 8 shows an example of integration ratio adjustment in accordance with at least one embodiment.

FIG. 8 shows an example of integration ratio adjustment in accordance with at least one embodiment. The shadows of the image in FIG. 8 are darker than the image of FIG. 7. The shadows of the image in FIG. 8 are at 9 stops (line 610) as opposed to 10 stops in FIG. 7. In order to increase the SNR at the shadows, the integration ratio of the first to second exposures is increased to the threshold integration time, thereby resulting in the desired minimum SNR being reached. In an embodiment, the integration ratio of the first to second exposures is not increased any further as that would result in violating the desired minimum SNR for the upper mid-tones.

The integration ratio of the second to third exposures, on the other hand, may be further increased without encroaching upon the desired minimum SNR for the lower mid-tones (at 624). The integration ratio of the second to third exposures may be further increased to increase the SNR of the shadows at the expense of the SNR of the lower mid-tones.

An output image may be generated based on the integration ratios of shown in FIG. 8. A first set of pixels of the first exposure may be merged with a second set of pixels of the second exposure and a third set of pixels of the third exposure to form the output image. The first exposure may contribute pixels having a brightness between 18.3 and 22 stops in the first exposure. The second exposure may contribute pixels having a brightness between 14.5 and 18.3 stops in the second exposure. The third exposure may contribute pixels having a brightness below 14.5 stops in the third exposure.

Figure 9:
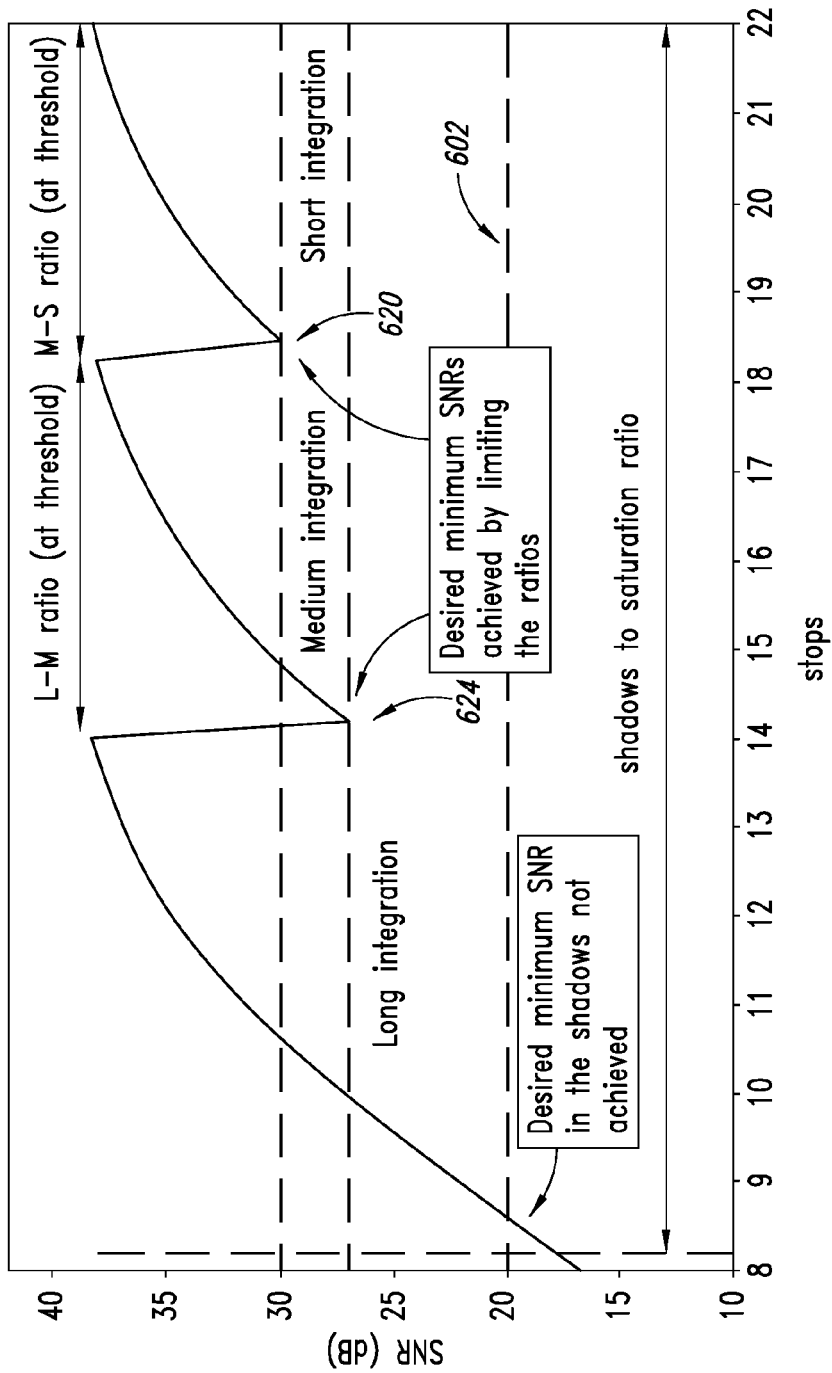
FIG. 9 shows an example of integration ratio adjustment in accordance with at least one embodiment.

FIG. 9 shows an example of integration ratio adjustment in accordance with at least one embodiment. In FIG. 9, the shadows of an image are at 8.2 stops. The integration ratios for the first to second exposures and the second to third exposures are both increased to their respective threshold integration ratios (at 620 and 624, respectively). However, despite increasing the integration ratios, the shadows still fall below their desired minimum SNR (at 602). Because the integration ratios for the first to second exposures and the second to third exposures are both at their determined thresholds, the SNR of the shadows is not increased. Thus, in FIG. 9, the SNRs of the mid-tones are prioritized over the SNR of the shadows.

Figure 10:
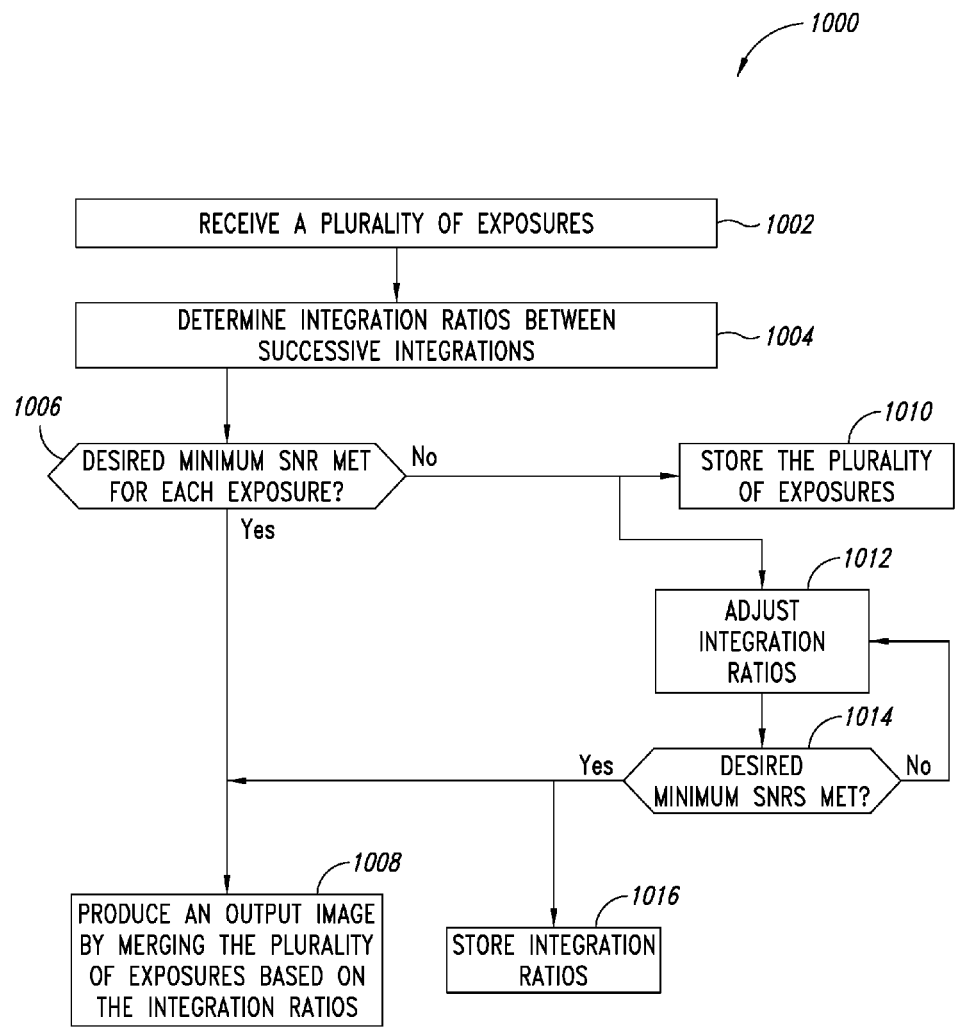
FIG. 10 shows a flow diagram of a method for producing an output image based on a plurality of exposures.

FIG. 10 shows a flow diagram for producing an output image based on a plurality of exposures. In the method 1000, a controller, such as the controller 402, described with reference to FIG. 4, receives a plurality of exposures at 1002. The controller determines, at 1004, the integration ratios between successive integrations. The integration ratios may, for example, be determined by partitioning the third ratio 616 described with reference to FIGS. 5-9.

At 1006, the controller determines, based on the integration ratios, if the desired minimum SNRs are met for each exposure. The desired minimum SNRs may be met if merging the plurality of exposures in accordance with the integration ratios results in merge transitions (between exposures) meeting the established desired minimum SNRs.

If the a positive determination is made, the controller, at 1008, produces an output image by merging the plurality of exposures based on the integration ratios determined at 1004. If a negative determination is made, the integration ratios are adjusted in order to improve the SNR performance across the tonal range of the output image. Adjustment of the integration ratios may result in the desired minimum SNRs being met for all merge transitions. At 1010, the controller stores the plurality of exposures. Storing the plurality of exposures may include buffering the plurality of exposures.

At 1012, the controller adjusts the integration ratios. Adjusting the integration ratios may include increasing an integration ratios such that its corresponding threshold integration ratio is met or becomes close to being met. At 1014, the controller determines whether the desired minimum SNRs are met based on the adjusted integration ratios. If a positive determination, the controller stores the integration ratios at 1016 and produces an output image by merging the plurality of exposures based on the adjusted integration ratios at 1008. After storing the integration ratios, the integration ratios may be used to determine the exposure times for a subsequent plurality of exposures.

If a negative determination is made at 1014, the method 1000 reverts to adjusting the integration ratios again at 1012. If the desired minimum SNRs are not met, the loop at 1012 and 1014 may be repeated for a limited number of times (for example, four times) after which the method 1000 terminates. For example, if the desired minimum SNRs are not met after multiple threshold adjustments, the output image may be produced based on adjusted ratios that do not meet the desired minimum SNRs, or default exposure ratios may be employed, etc.

If the desired minimum SNRs are not met for a given plurality of exposures, another plurality of exposures may be taken with different exposure times. For example, if the desired minimum SNR for the exposure having the longest exposure time is not met, the exposure time may be increased to improve the SNR of the exposure.

Figure 11:
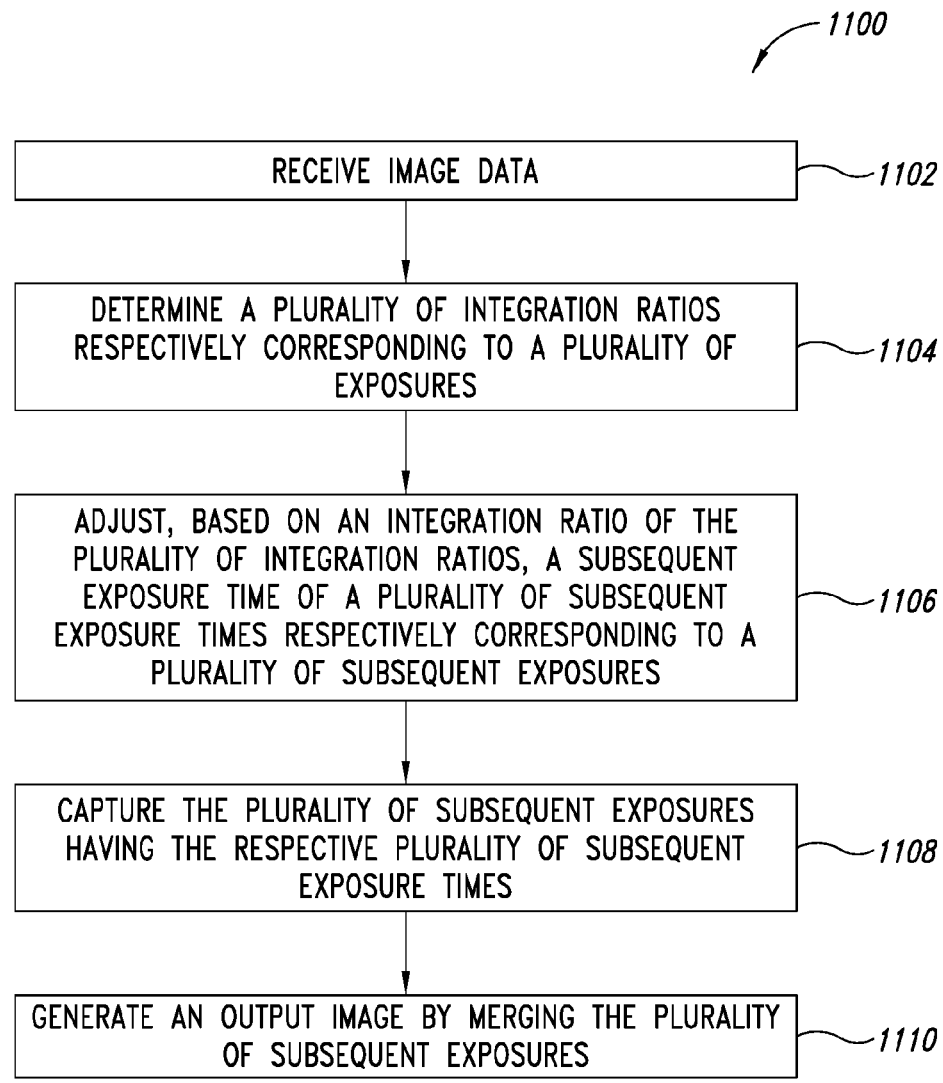
FIG. 11 shows a flow diagram of a method for producing an output image.

FIG. 11 shows a flow diagram for a method for producing an output image. In the method 1100, a controller, such as the controller 402, described with reference to FIG. 4, receives image data at 1102. As described herein, the controller determines, at 1104, a plurality of integration ratios respectively corresponding to a plurality of successive integrations. The integration ratios, when used to generate an output image, may fail to meet the desired minimum SNRs for the plurality of exposures. At least one of the plurality of exposure times may be adjusted in order to improve the SNR for its respective exposure. For example, if a desired minimum SNR for an exposure is not met even when the plurality of integration ratios are set to the determined plurality of threshold integration ratios, respectively, the exposure time of the exposure is increased to improve its SNR. Increasing the exposure time may result in the SNR of the exposure meeting or exceeding the desired minimum SNR at a merge transition.

The controller, at 1106, adjusts, based on an integration ratio of the plurality of integration ratios, exposure times of a plurality of subsequent exposures. The controller, at 1108, causes a sensor to capture the plurality of subsequent exposures having the plurality of subsequent exposure times, respectively. For example, the controller may send a command to the sensor to capture the plurality of subsequent exposures having the respective plurality of subsequent exposure times. The controller may receive the plurality of subsequent exposures (or data representing the plurality of subsequent exposures) from the sensor. At 1110, the controller generates an output image by merging the plurality of subsequent exposures.

In an embodiment, overall scene brightness may be used to control pixel gain for a sensor. Pixel gain may be set based on a mean energy of the test exposure. To obtain the mean energy, a histogram of the test exposure may be obtained. The mean energy of the test exposure may be the average pixel intensity of the test exposure.

After obtaining the mean pixel energy of the test exposure, the overall scene brightness may be obtained as the product of the mean pixel energy and the exposure time of the test exposure. The overall scene brightness may then be compared to two thresholds; an upper threshold and a lower threshold. The two thresholds are used to form a hysteresis, whereby if the overall scene brightness decreases below the lower threshold, the pixel gain may be increased. Further, if the overall scene brightness increased above the upper threshold, the pixel gain is decreased. The pixel gain may be used to control the SNR of the plurality of exposures and the output image generated by merging the plurality of exposures.

The factors that affect the pixel gain include the integration time and analog and digital gains of the sensor. If the pixel gain is sought to be modified as a result of changes to the overall scene brightness, the integration time, analog gain and/or digital gain may be modified to achieve the desired change to the pixel gain.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
an input, which, in operation, receives image data;
digital image processing circuitry, which, in operation:
determines a shadow threshold based on the image data;
determines, for each merge transition of a plurality of exposures having a respective plurality of exposure times, a respective threshold integration ratio based on a threshold signal-to-noise ratio (SNR) for the merge transition;
determines, based on the shadow threshold and the threshold integration ratios, an integration ratio for each merge transition; and
generates an output image based on the determined integration ratios for each merge transition.

2. The apparatus of claim 1, wherein generating the output image includes merging the plurality of exposures based on the determined integration ratios for the merge transitions.

3. The apparatus of claim 1, wherein the digital image processing circuitry adjusts exposure times of a plurality of subsequent exposures based on the integration ratios for the plurality of merge transitions.

4. The apparatus of claim 3, wherein generating the output image includes:
sending, to a sensor, a command to capture the plurality of subsequent exposures having the adjusted exposure times;
receiving, at the input, the plurality of subsequent exposures having the adjusted exposure times; and
generating the output image by merging the plurality of subsequent exposures having the adjusted exposure times.

5. The apparatus of claim 3, wherein the plurality of exposure times are different from each other.

6. The apparatus of claim 1, wherein determining the integration ratio for the merge transition includes:
identifying a first ratio between a saturation point of a first exposure having a shortest exposure time and the shadow threshold;
dividing the first ratio into respective integration ratios for each merge transition; and
adjusting the integration ratios based on the threshold integration ratios for merge transitions.

7. The apparatus of claim 6, wherein the saturation point of the first exposure is a maximum pixel level of the first exposure.

8. The apparatus of claim 6, wherein dividing the first ratio includes setting a portion of the first ratio as a first integration ratio for a first merge transition between the first exposure and a second exposure of the plurality of exposures and setting a remainder of the first ratio as the second integration ratio for the second exposure.

9. The apparatus of claim 1, wherein determining the threshold integration ratio for each merge transition includes determining the threshold integration ratio based on an SNR model of a sensor used to capture the plurality of exposures.

10. The apparatus of claim 2, wherein merging the plurality of exposures includes using a first exposure of the plurality of exposures to provide pixels of an upper mid-tone region of a scene, using one or more other exposures of the plurality of exposures to provide pixels of a lower mid-tone region of the scene, and using another exposure of the plurality of exposures to provide pixels of a shadow region of the scene.

11. A system, comprising:
a sensor, which, in operation, captures an image of a scene and outputs image data representative of the scene; and
digital image processing circuitry, which, in operation:
receives the image data;
determines a shadow threshold based on the image data;
determines, for each merge transition of a plurality of exposures having a respective plurality of exposure times, a respective threshold integration based on a threshold signal-to-noise ratio (SNR) for the merge transition;

determines, based on the shadow threshold and the threshold integration ratios, an integration ratio for each merge transition; and generates an output image based on the determined integration ratios for each merge transition.

12. The system of claim 11, wherein generating the output image includes merging the plurality of exposures based on the determined integration ratios for the merge transitions.

13. The system of claim 11, wherein the digital image processing circuitry adjusts exposure times of a plurality of subsequent exposures based on the integration ratios for the plurality of merge transitions.

14. The system of claim 13, wherein generating the output image includes:

sending, to the sensor, a command to capture the plurality of subsequent exposures having the adjusted exposure times;

receiving the plurality of subsequent exposures having the adjusted exposure times; and generating the output image by merging the plurality of subsequent exposures having the adjusted exposure times.

15. A method, comprising:

receiving image data;

determining a shadow threshold based on the image data;

determining, for each merge transition of a plurality of exposures having a respective plurality of exposure times, a respective threshold integration ratio based on a threshold signal-to-noise ratio (SNR) for the merge transition;

determining, based on the shadow threshold and the threshold integration ratios, an integration ratio for each merge transition; and generating an output image based on the determined integration ratios for each merge transition.

16. The method of claim 15, wherein generating the output image includes merging the plurality of exposures based on the determined integration ratios.

17. The method of claim 15, further comprising:

adjusting exposure times of a plurality of subsequent exposures based on the integration ratios for the plurality of merge transitions.

18. The method of claim 17, wherein generating the output image includes:

sending, to a sensor, a command to capture the plurality of subsequent exposures having the adjusted exposure times;

receiving the plurality of subsequent exposures having the adjusted exposure times; and generating the output image by merging the plurality of subsequent exposures having the adjusted exposure times.

19. An apparatus, comprising:

means for receiving image data;

means for processing the received image data including:

determining a shadow threshold based on the image data;

determining, for each merge transition of a plurality of exposures having a respective plurality of exposure times, a respective threshold integration ratio based on a threshold signal-to-noise ratio (SNR) for the merge transition;

determining, based on the shadow threshold and the threshold integration ratios, an integration ratio for each merge transition; and generating an output image based on the determined integration ratios for each merge transition.

20. The apparatus of claim 19, comprising an integrated circuit, the integrated circuit including one or more of: the means for receiving image data and the means for processing the received image data.

21. The apparatus of claim 19, wherein the means for processing the received image data includes means for adjusting exposure times of a plurality of subsequent exposures based on the integration ratios for the plurality of merge transitions.

22. The apparatus of claim 21, wherein the means for processing the received image data, in operation:

sends, to a sensor, a command to capture the plurality of subsequent exposures having the adjusted exposure times;

receives the plurality of subsequent exposures having the adjusted exposure times; and generates the output image by merging the plurality of subsequent exposures having the adjusted exposure times.

* * * * *